United States Patent
Monaco

[19]
[11] Patent Number: 5,881,582
[45] Date of Patent: Mar. 16, 1999

[54] MULTI-PURPOSE LOCKOUT

[75] Inventor: Garry A. Monaco, Hoffman Estates, Ill.

[73] Assignee: Panduit Corp., Tinley Park, Ill.

[21] Appl. No.: 921,644

[22] Filed: Aug. 27, 1997

Related U.S. Application Data

[60] Provisional application No. 60/024,669 Aug. 30, 1996.

[51] Int. Cl.⁶ .................................................. E05B 73/00
[52] U.S. Cl. ........................................ 70/14; 70/19; 70/30
[58] Field of Search ................................. 70/14, 18, 19, 70/58, 30, 49

[56] References Cited

U.S. PATENT DOCUMENTS

| | | | |
|---|---|---|---|
| 2,560,624 | 7/1951 | Bartlett | 70/19 X |
| 3,667,259 | 6/1972 | Reque et al. | 70/14 |
| 3,703,821 | 11/1972 | Dorey | 70/38 R |
| 3,987,653 | 10/1976 | Lyon et al. | 70/19 |
| 4,864,834 | 9/1989 | Waite | 70/14 |
| 5,009,087 | 4/1991 | Long | 70/49 |
| 5,020,342 | 6/1991 | Doan et al. | 70/14 |
| 5,035,126 | 7/1991 | Biba | 70/18 |
| 5,070,712 | 12/1991 | Fox | 70/18 |
| 5,154,072 | 10/1992 | Leyden | 70/18 |
| 5,167,135 | 12/1992 | Gobeski | 70/14 |
| 5,365,757 | 11/1994 | Primeau | 70/14 |
| 5,473,917 | 12/1995 | Say | 70/14 X |
| 5,517,835 | 5/1996 | Smith | 70/14 |
| 5,582,042 | 12/1996 | Mordick | 70/14 |

FOREIGN PATENT DOCUMENTS 2 330 833    7/1977    France .

Primary Examiner—Suzanne Dino Barrett
Attorney, Agent, or Firm—Mark D. Hilliard; Robert A. McCann; Michael J. Turgeon

[57] ABSTRACT

A multi-purpose lockout device having a shackle for securing to a hasp to prevent unauthorized use of a machine or the like and also includes a pair of cable receiving openings for securely engaging ends of a cable that has been passed through a device such as a valve to prevent its use.

10 Claims, 7 Drawing Sheets

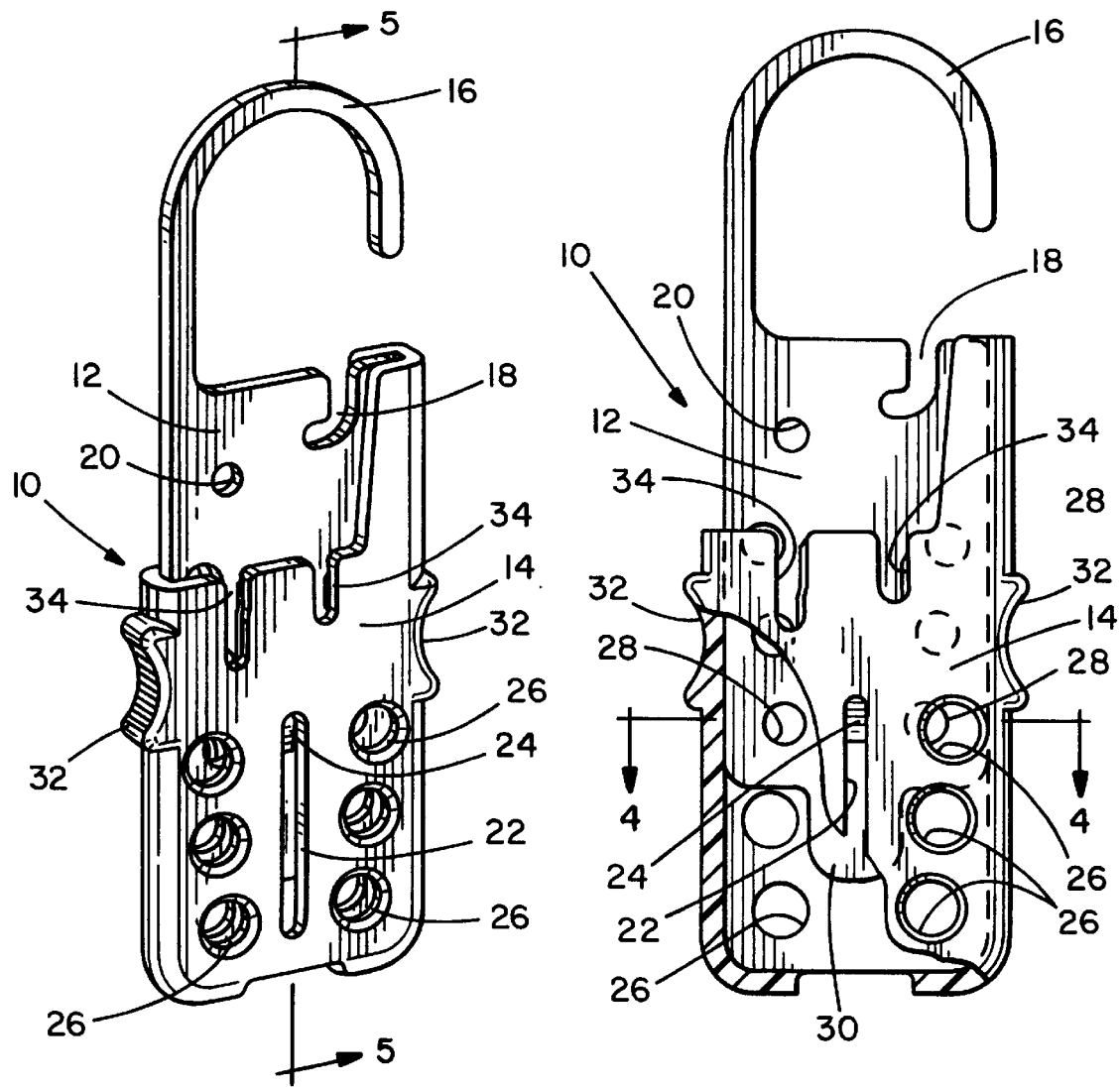
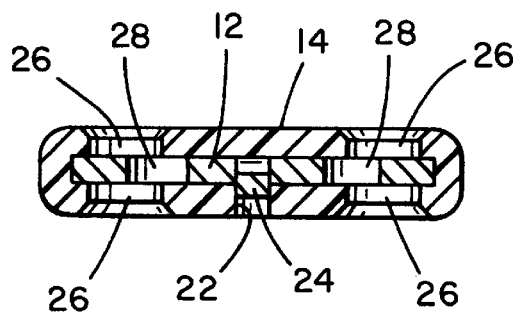
FIG. 2  FIG. 3
FIG. 4

MULTI-PURPOSE LOCKOUT

This application claims the benefit of U.S. Provisional Application No. 60/024,669, filed Aug. 30, 1996.

TECHNICAL FIELD

The present invention relates to a lockout device and more particularly to a multi-purpose lockout device which multiple operators can use as a hasp lockout device utilizing a shackle locking assembly and also as a valve lockout device utilizing a cable securing assembly.

BACKGROUND OF THE INVENTION

A variety of lockout devices are known in the art for locking to a hasp of an article to prevent unauthorized use of a machine or other article. Many of these lockout devices utilize a shackle for engagement with the hasp and a plurality of padlock-accepting holes to prevent removal of the lockout from the hasp in order to allow multiple users to prevent unauthorized use of the device. Additionally, prior art devices are known which use a clamping assembly to engage both ends of a looped cable that is used to prevent unauthorized use of other devices such as gate valves. None of the prior art lockout devices combine the ability of having a shackle lockout mechanism for use with hasps as well as a cable securing lockout mechanism for use with gate valves and the like.

SUMMARY OF THE INVENTION

It is therefore an object of the present invention to provide an improved lockout device.

It is further an object of the invention to provide a multi-purpose lockout device which utilizes a shackle mechanism for locking out hasps and other devices as well as a cable locking assembly for locking out gate valves and other devices.

BRIEF DESCRIPTION OF THE DRAWINGS

FIG. 2 is a perspective view of the lockout device of the present invention.

FIG. 3 is a front view of the lockout device of FIG. 2.

FIG. 4 is a sectional view of the lockout device taken along lines 4—4 of FIG. 3.

DESCRIPTION OF THE PREFERRED EMBODIMENT

Figure 1:
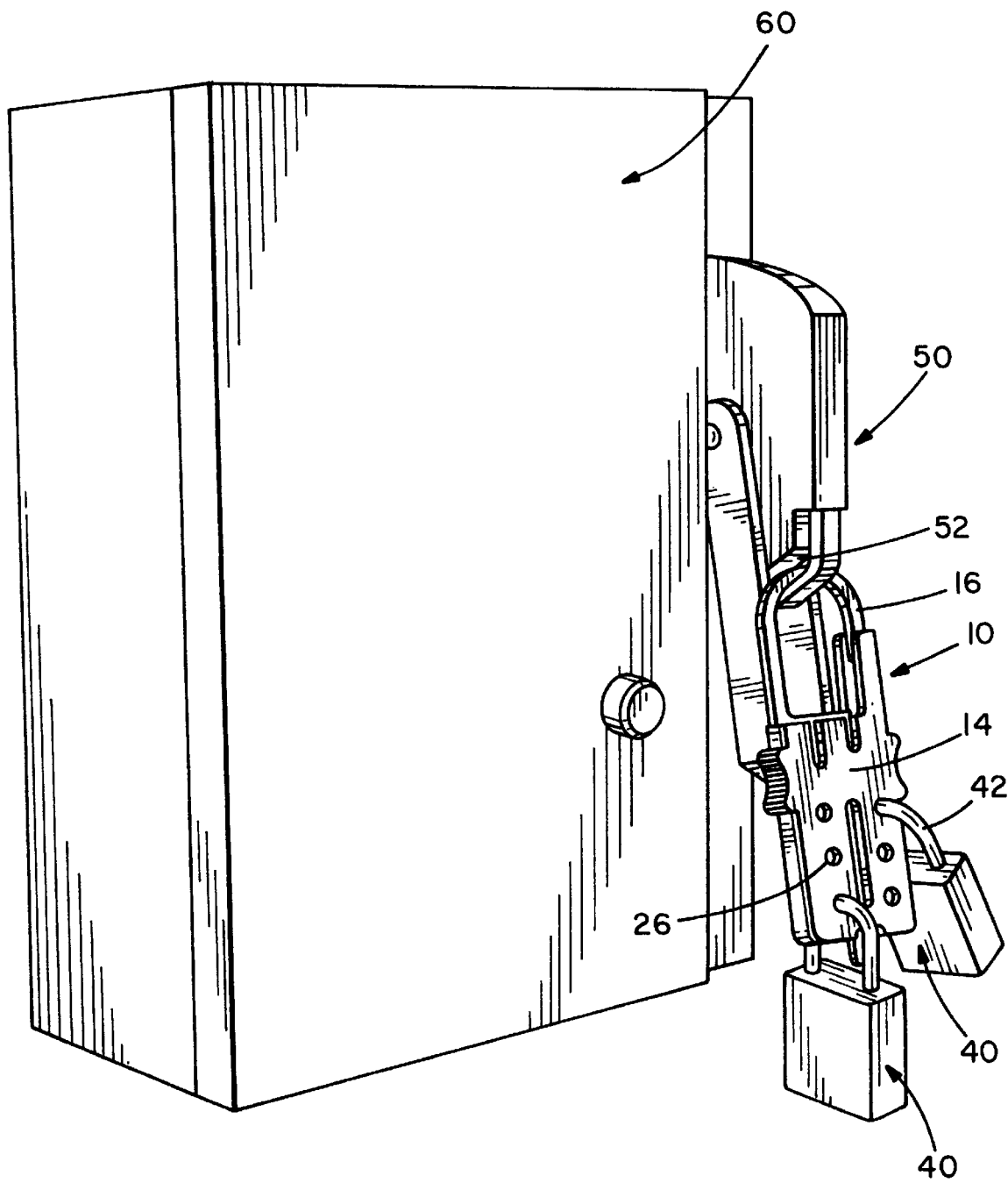
FIG. 1 is a perspective view of the lockout device of the present invention shown engaged to a hasp of a circuit breaker box.
Figures 5, 6, 7:
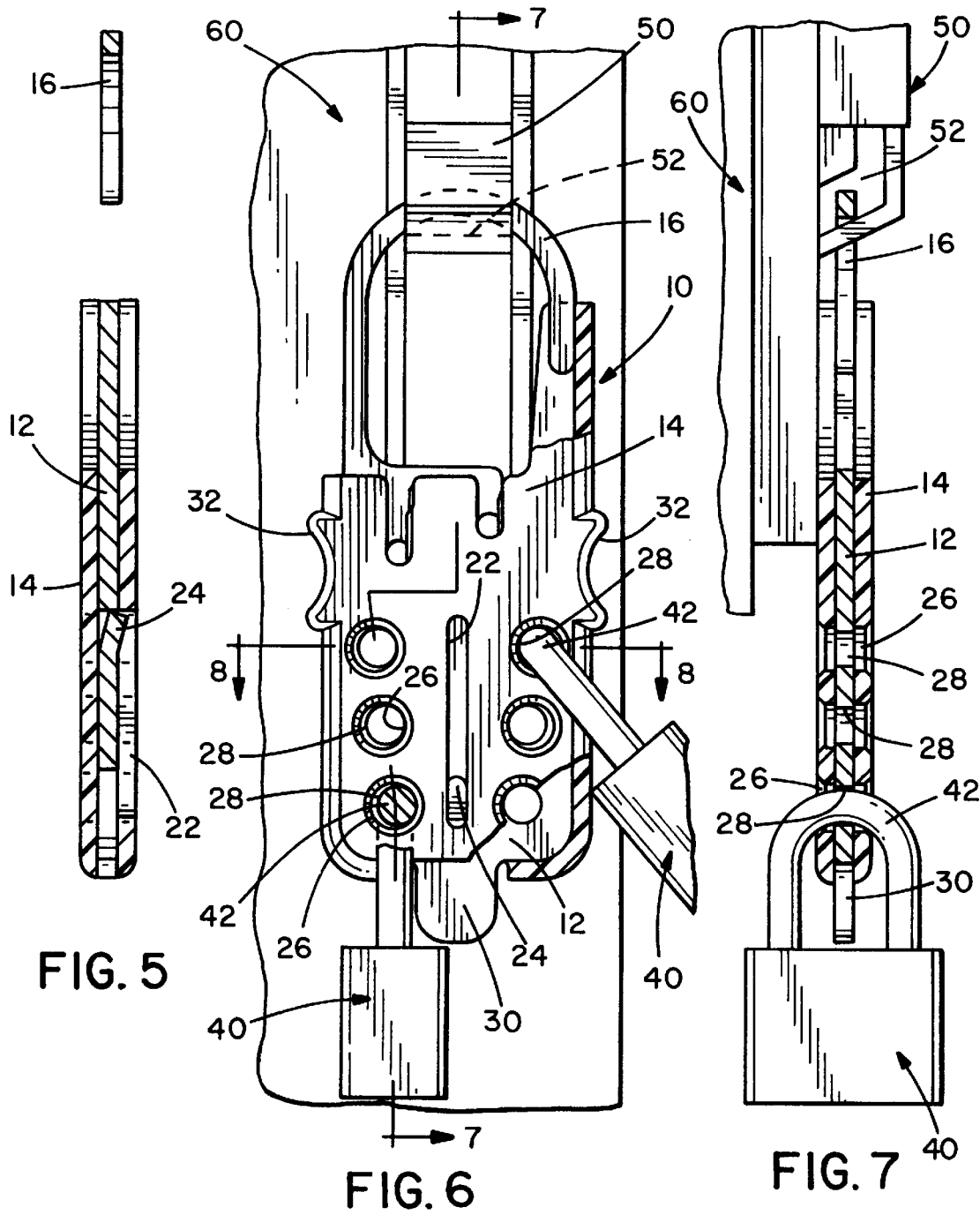
FIG. 5 is a sectional view of the lockout device taken along lines 5—5 of FIG. 2.
FIG. 6 is a front view of the engaged lockout device of FIG. 1 shown secured by a pair of padlocks.
FIG.7 is a sectional view of the engaged lockout device taken along lines 7—7 of FIG. 6.
Figure 8:
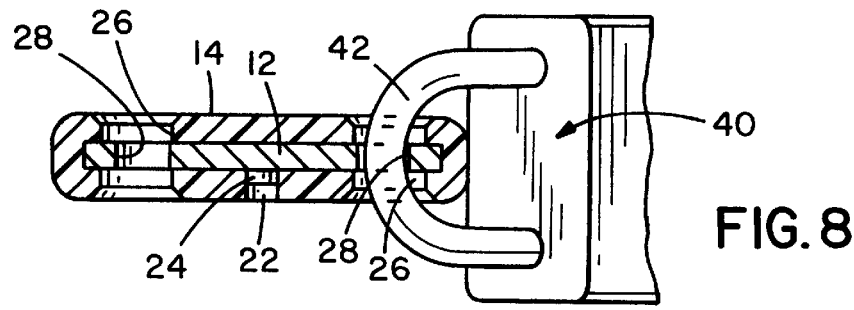
FIG. 8 is a sectional view of the engaged lockout device taken along lines 8—8 of FIG. 6.
Figure 9:
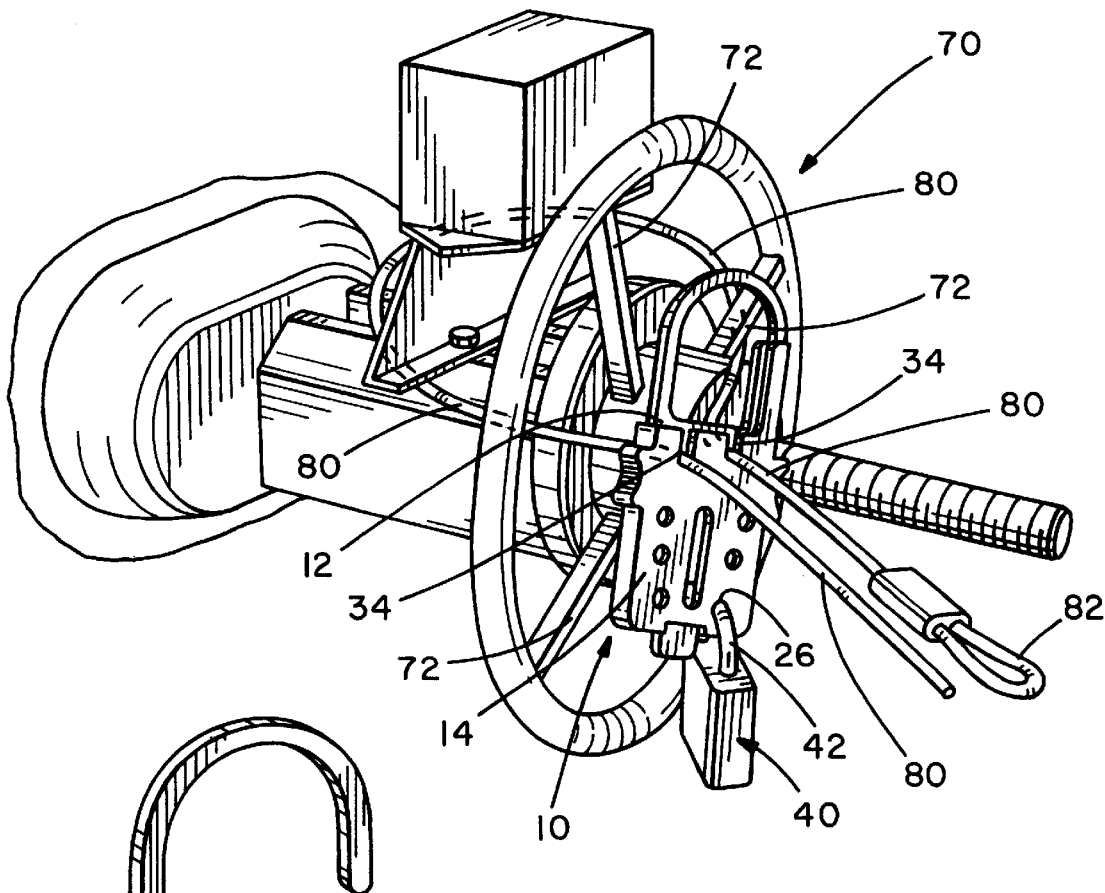
FIG. 9 is a perspective view of the lockout device shown with a cable applied to a gate valve.
Figure 10:
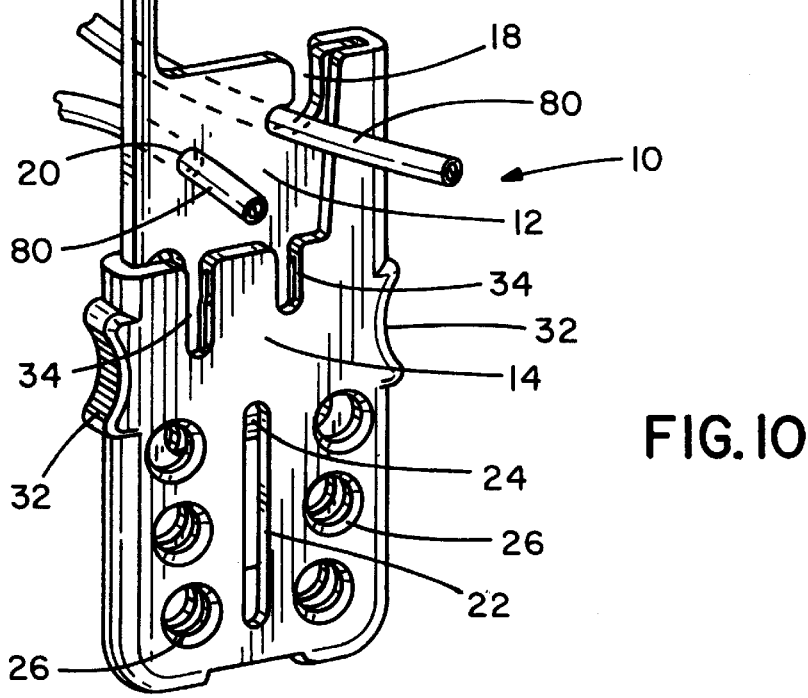
FIG. 10 is a perspective view of the lockout device as in FIG. 2 with a cable in position to be engaged.
Figure 11:
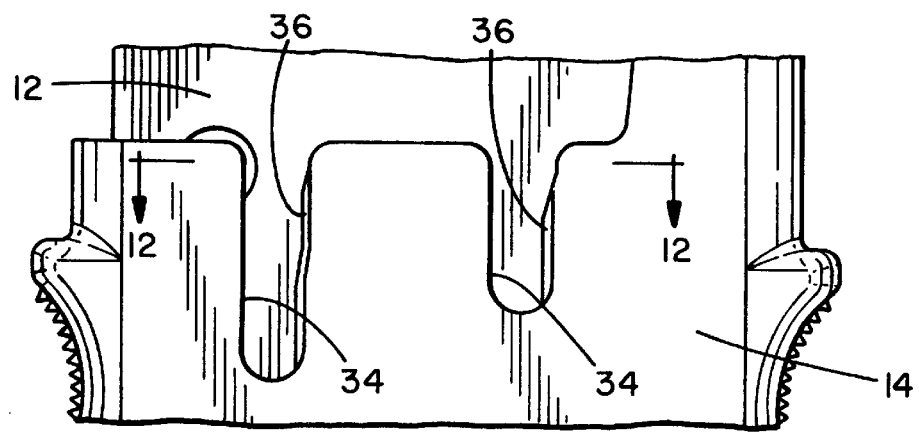
FIG. 11 is an enlarged partial front elevational view of the cable securing mechanism of the lockout device.
Figure 12:
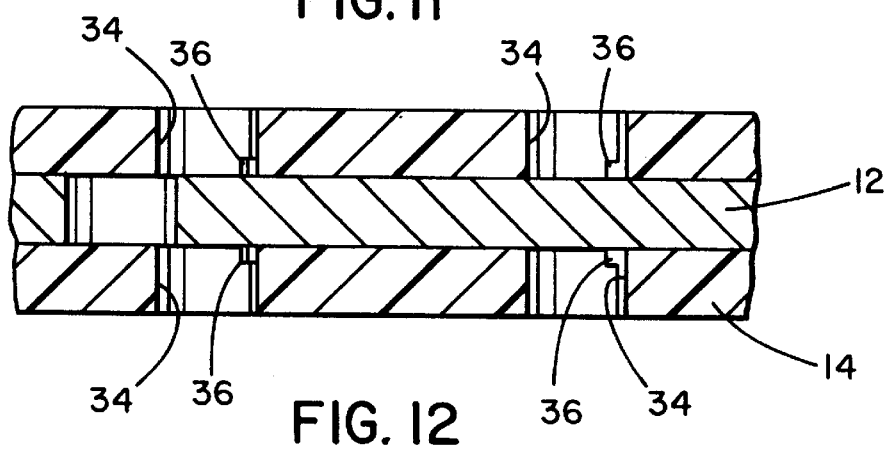
FIG. 12 is a sectional view of the cable securing mechanism taken along lines 12—12 of FIG. 11.

The lockout device embodying the concept of the present invention is designated generally by the reference numeral 10 in the accompanying drawings. FIG. 1 shows the lockout device 10 applied to a hasp 50 of a circuit breaker box 60. As shown in FIGS. 2 and 3, lockout device 10 is a two-part assembly comprising a lock body 12 slidably engaged with a lock housing sleeve 14. Lock body 12 is formed as a metal plate with a shackle 16 extending from a first end and including a plurality of apertures 28 formed therethrough. The housing sleeve 14 has an open end and an enclosed opposite end. The housing sleeve also includes an assembly retention guide slot 22 which corresponds to a snap lug 24 formed on the lock body 12. Snaplug 24 prevents the lock body 12 from being disengaged from the housing sleeve 14 through the open end when the lock body 12 is moved to a fully open position as shown in FIG. 3. Lock body 12 is slidable within plastic housing sleeve 14 between the open position and the fully inserted position when lock body 12 reaches the enclosed opposite end that stops the lock body 12 from passing through the housing sleeve 14 as shown in FIG. 6. As best seen in FIGS. 2 and 3, housing sleeve 14 includes shackle receiving holes 26 that correspond to the apertures 28 of the lock body upon full insertion of the lock body 12 into a locking position, to permit the engagement with a shackle 42 of a padlock 40. Both the apertures 28 of lock body 12 and the shackle receiving holes 26 of housing sleeve 14 are disposed in a converging manner towards the end opposite the shackle 16. This alignment results in the prevention of the application of a lock shackle 42 to the lockout device 10 prior to the lock body 12 being fully inserted to the aligned position of the housing sleeve 14.

Lock body 12 is further provided with a disengagement tab 30 which extends from the end opposite shackle 16 through an opening of housing sleeve 14. This tab 30 helps in slidably releasing the lock body from the fully inserted locking position. Housing sleeve 14 also includes thumb grips 32 disposed on opposing lateral sides to accommodate the handling of the device 10.

In use, the shackle 16 of the lock body 12 is engaged through an opening 52 of a hasp 50 of a device which is intended to be locked out as shown in FIG. 1. The lock body 12 is then shoved into the fully inserted position within the housing sleeve 14 into the position in which holes 26 and apertures 28 substantially align so that a shackle 42 of a standard lock 40 can be passed through one of the shackle receiving holes 26 to secure the device in the locked position. The multiple shackle accepting holes 26 allow for multiple users to work on various parts of machinery that is locked out without the risk of a single user removing the lockout assembly while other users are still working.

The shackle receiving holes 26 are sized so as to accept both the standard PSL-11 ¼ inch diameter shackle and the PSL-3 9/32 inch diameter shackle. A radius has been added to all shackle receiving holes 26 on the outside surface of the housing sleeve 14. The hole centers of the lock body access holes 28 have been offset with respect to the shackle receiving holes 26 to accept the PSL-3 inside shackle diameter while minimizing assembly free play when using the PSL-11 padlocks which are a smaller diameter shackle.

Figure 13:
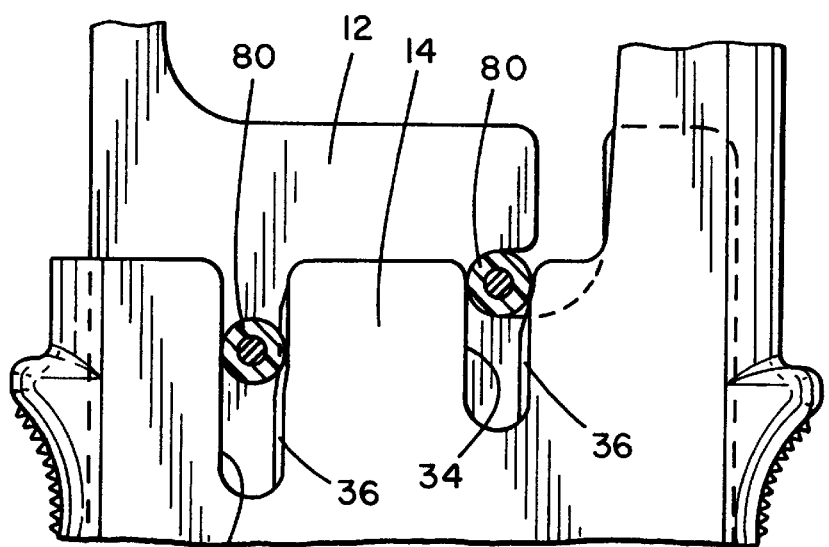
FIG. 13 is an enlarged partial front elevational view of the cable securing mechanism showing a cable in a partially engaged position.
Figure 14:
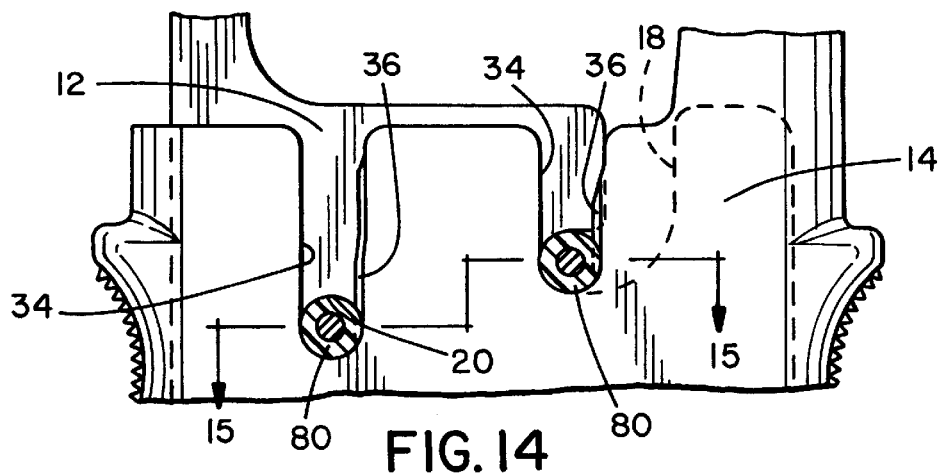
FIG. 14 is an enlarged partial front elevational view of the cable securing mechanism fully engaged in the locked position.
Figure 15:
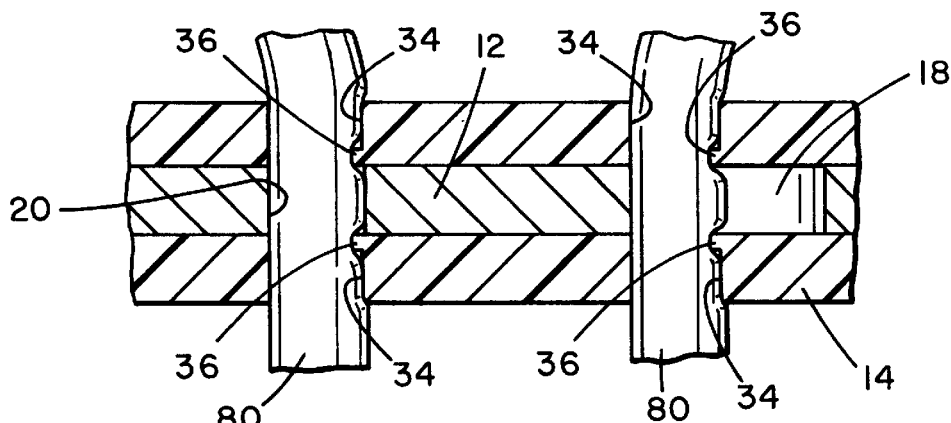
FIG. 15 is a sectional view of the cable securing mechanism taken along lines 15—15 of FIG. 14.
Figure 16:
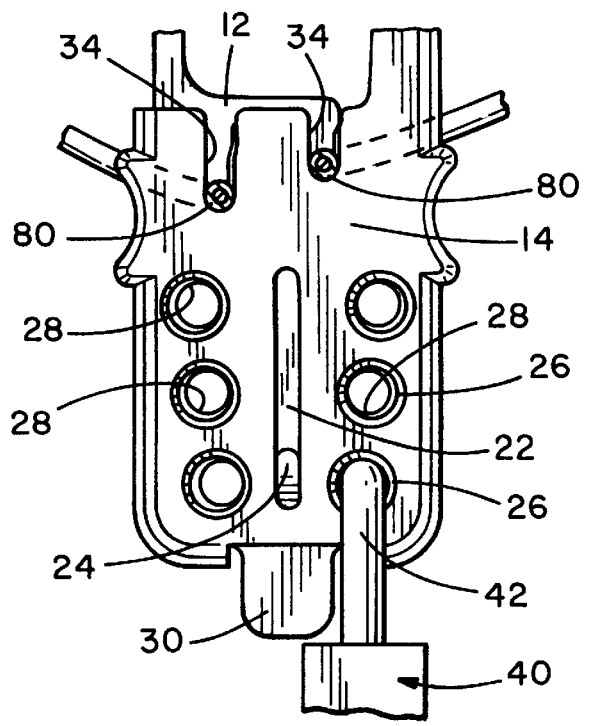
FIG. 16 is a partial front elevational view of the cable securing mechanism shown secured by a padlock.

Lock body 12 also includes a cable receiving aperture 20 and a cable receiving slot 18. The housing sleeve 14 includes a pair of cable lock slots 34 which upon sliding engagement of lock body 12 within the housing sleeve 14 into the fully inserted position correspond with the cable receiving slot and aperture 18, 20 respectively. As can be seen in FIG. 13, the cable receiving slot 18 extends interiorly from a first end at the shackle end of the lock body in a curved fashion such that the second interior end of slot 18 is laterally spaced from the first end of the slot. This prevents removal of the cable once the lock body is locked into the fully inserted position. This arrangement provides a means for securely engaging two separate ends of a cable 80. Therefore, cable 80 can be passed through and around the spokes 72 of a gate valve assembly 70 and secured through use of the cable lock slots 34 to the lockout assembly 10 to prevent unauthorized use of the gate valve 70. The multiple shackle accepting holes 26 similarly allow for multiple users to prevent unauthorized use of the device. The depth of the cable lock slot 18 is staggered in relation to the cable hole 20 to allow for the cable to be disengaged from lock slot 18 by sliding lock body 12 out of the fully inserted position and having the cable still engaged with the cable receiving aperture 20. As can be seen in FIGS. 11–15, cable lock slots 34 include ridges 36 which bite into the cable 80 to help securely engage the cable.

Figure 17:
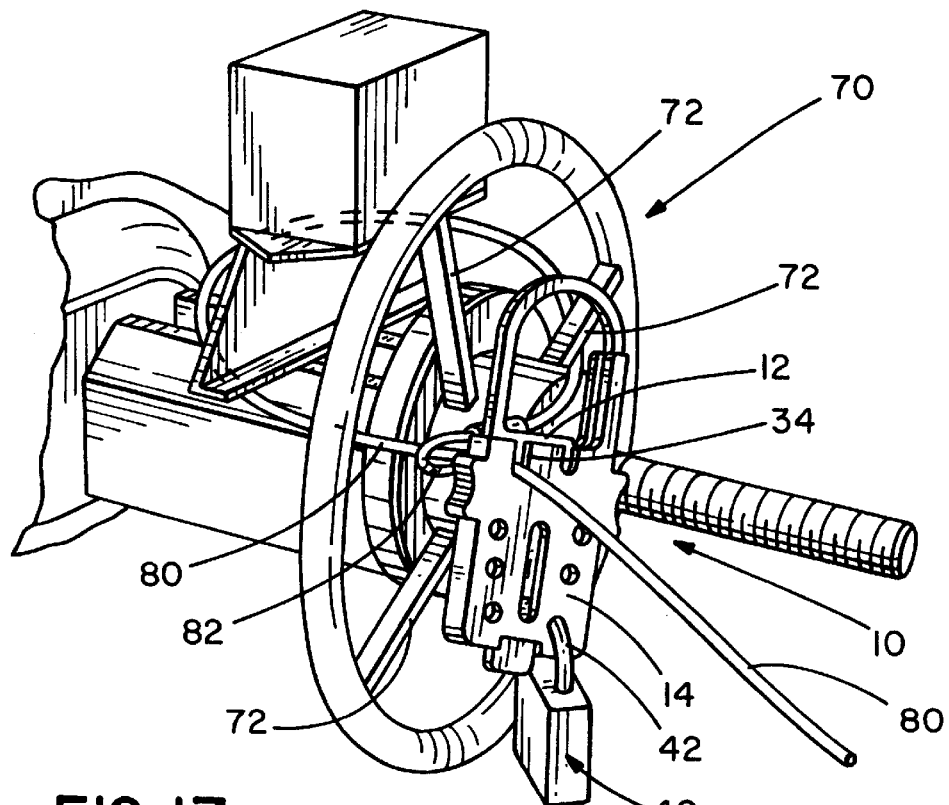
FIG. 17 is a perspective view of the cable securing mechanism shown applied to a gate valve by a second method.
Figure 18:
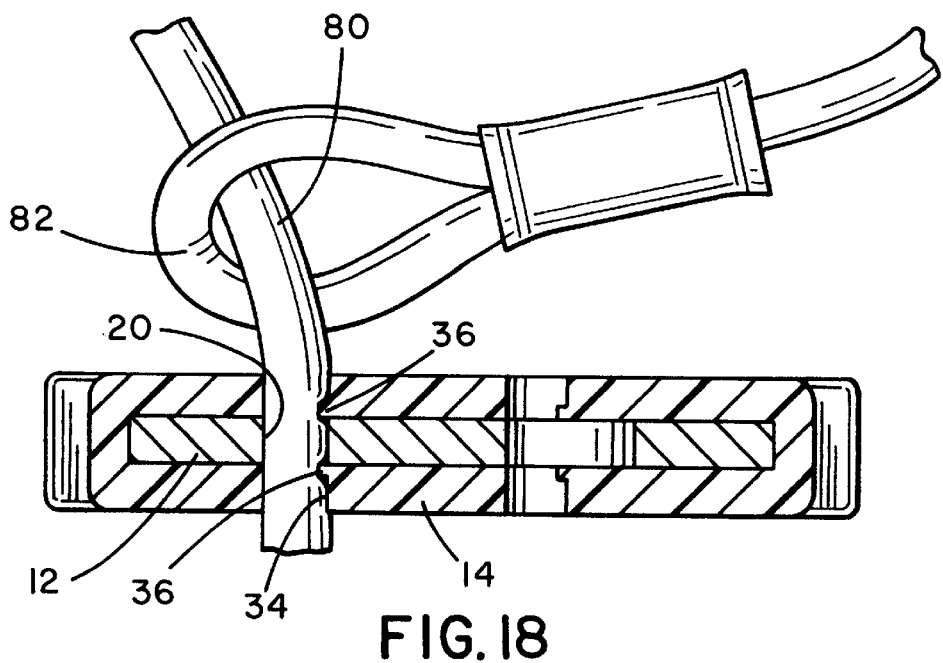
FIG. 18 is a sectional view of a portion of the cable securing mechanism of FIG. 17.

FIGS. 17 and 18 show the cable lockout mechanism being used to lockout a gate valve through a second method that utilizes only the cable receiving hole.

While the particular embodiment of the present invention has been shown and described, it will be obvious to those skilled in the art that changes and modifications may be made without departing from the invention and its broader aspects. The matter set forth in the foregoing description and accompanying drawings is offered by way of illustration only and not as a limitation.

I claim:

1. A multi-purpose lockout device comprising:
    a lockout body including a shackle at one end for engaging with a hasp;
    a housing sleeve engaged with and slidably movable with respect to the lockout body and including cable securing means in cooperation with the lock body for lockably securing a cable to the lockout device;
    a plurality of shackle receiving holes formed through the housing sleeve and a plurality of apertures disposed on the lock body such that when the lock body is slidably moved within the housing sleeve to a fully inserted position, the plurality of shackle receiving holes are in alignment with the plurality of apertures on the lock body, wherein both the plurality of shackle receiving holes and the plurality of lock body apertures are disposed in a converging manner towards an end of the lockout device.

2. A multi-purpose lockout device according to claim 1, wherein the cable securing means secures the cable at a pair of spaced apart points on the lockout device.

3. A multi-purpose lockout device according to claim 1, wherein the lockout body includes a disengagement tab which extends from an end opposite the shackle.

4. A lockout device comprising:
    a housing sleeve having a plurality of shackle receiving holes;
    a lock body slidably movable within the housing sleeve having an integral shackle at one end and including a plurality of apertures;
    said shackle receiving holes and said apertures are respectively situated such that when said lock body is slidably moved within the housing sleeve to a fully inserted position, the plurality of shackle receiving holes are in alignment with the plurality of apertures on the lock body; and
    a plurality of cable engaging openings on the lock body adapted for receiving and securing an end of a cable, one of the cable engaging openings is a slot wherein the slot extends from a first end at an end of the lock body and is curved such that an interior end of the slot is laterally spaced from the first end.

5. A lockout device according to claim 4, wherein the lockout body includes a disengagement tab which extends from an end opposite the shackle.

6. A multi-purpose lockout device comprising:
    a lockout body having a shackle at one end and including a cable receiving slot wherein the lockout body is slidably movable within a housing sleeve between an open position and a fully inserted position, wherein the lockout body and the housing sleeve cooperate to form means for lockably preventing movement from the fully inserted position wherein the cable receiving slot extends from a first end at an end of the lock body and is curved such that an interior end of the slot is laterally spaced from the first end.

7. A lockout device comprising:
    a first part having a lockout body with a shackle extending from one end and including a first aperture and a curved slot portion formed on said lockout body;
    a second part engaged with the first part having a second aperture and a slot formed therethrough;
    wherein the second part is movable with respect to the first part such that the first and second apertures are aligned and a portion of the slot and the curved slot cooperate to form a cable securing opening.

8. A lockout device according to claim 7, wherein the curved slot extends from a first end at an end of the lock body and is curved such that an interior end of the slot is laterally spaced from the first end.

9. A lockout device according to claim 7, wherein the slot formed on the second part is generally linear.

10. A lockout device according to claim 7, wherein the slot formed on the second part includes a ridge formed on a sidewall.

* * * * *